United States Patent Office 3,215,537
Patented Nov. 2, 1965

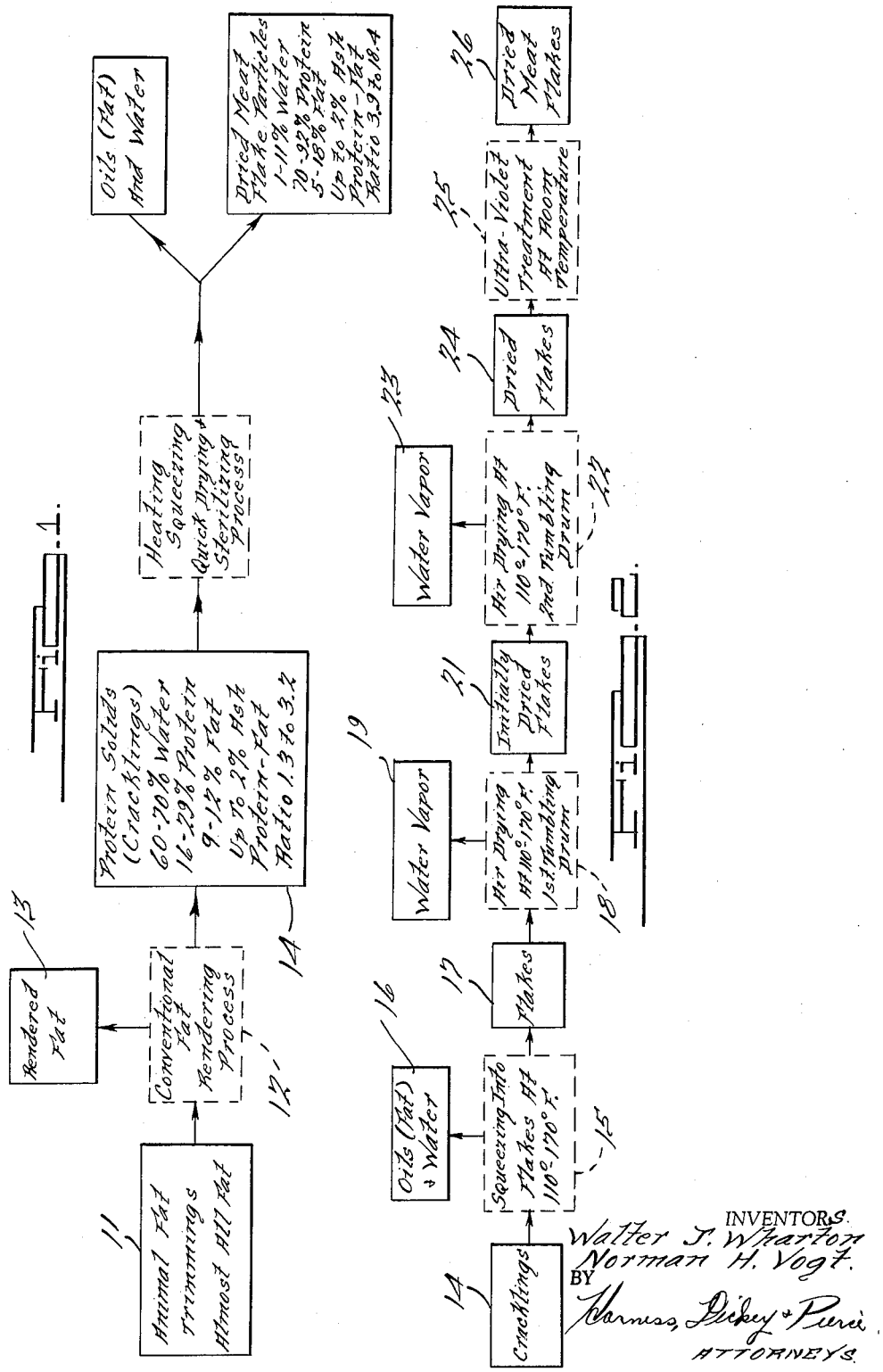

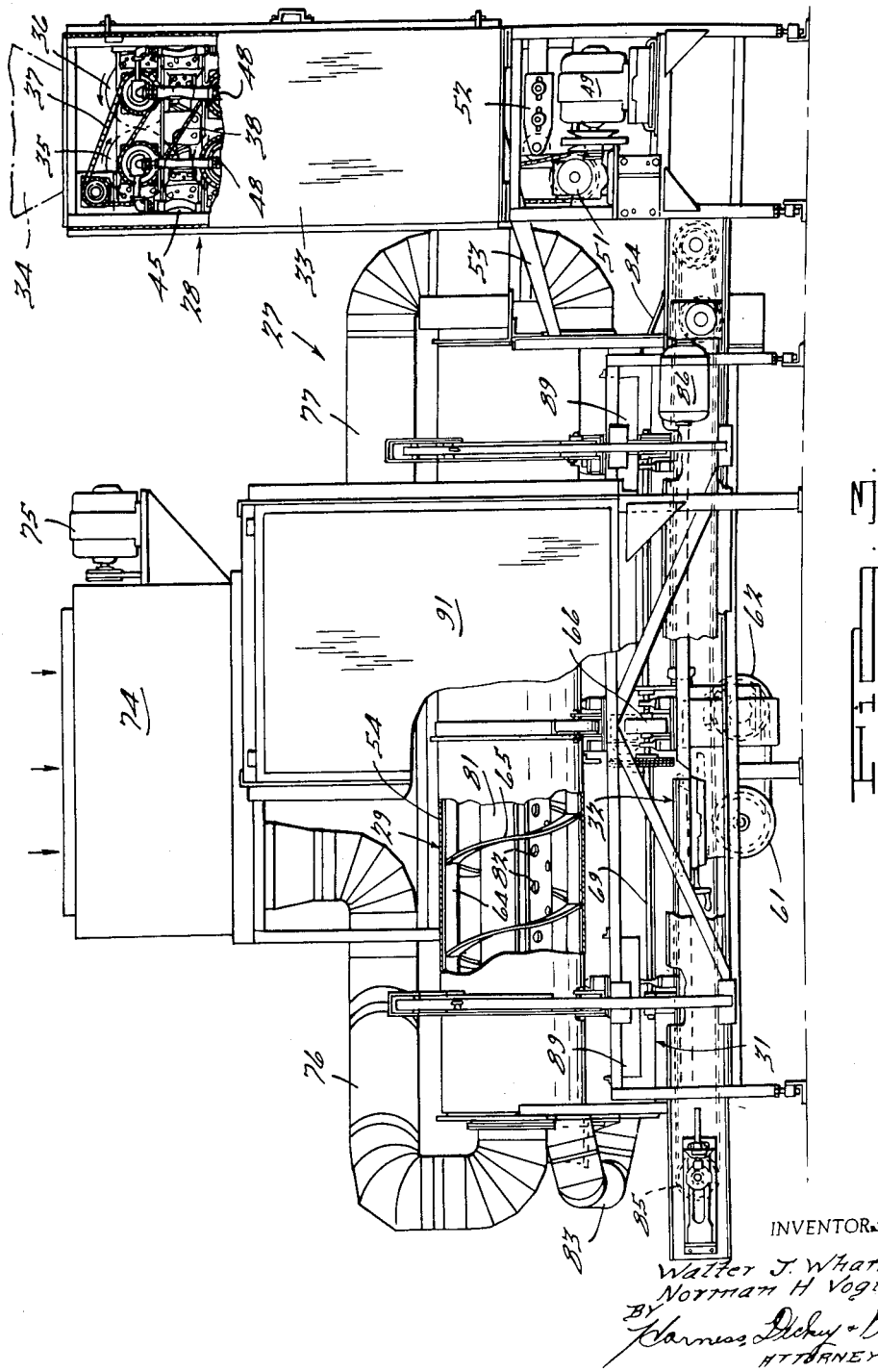

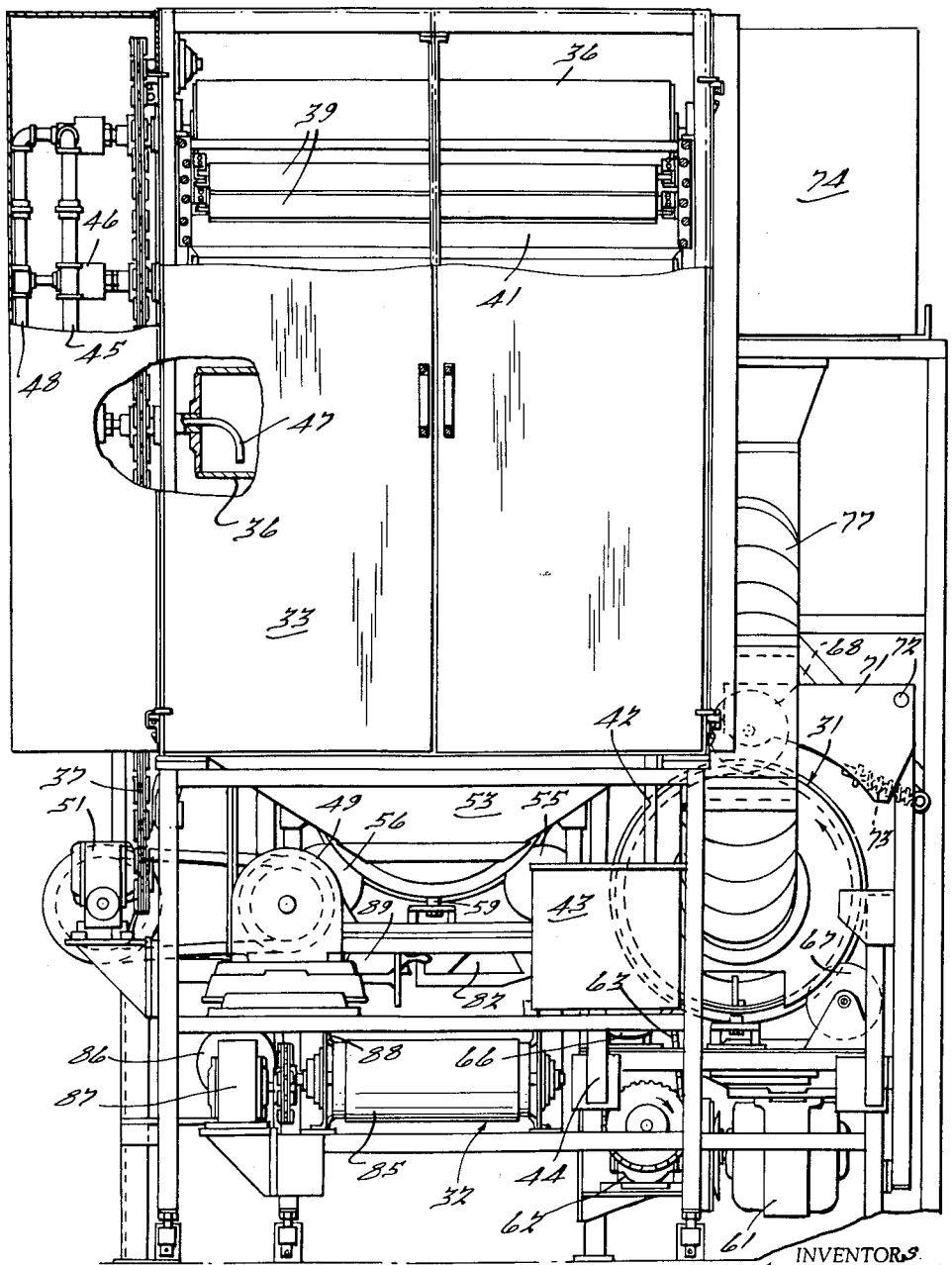

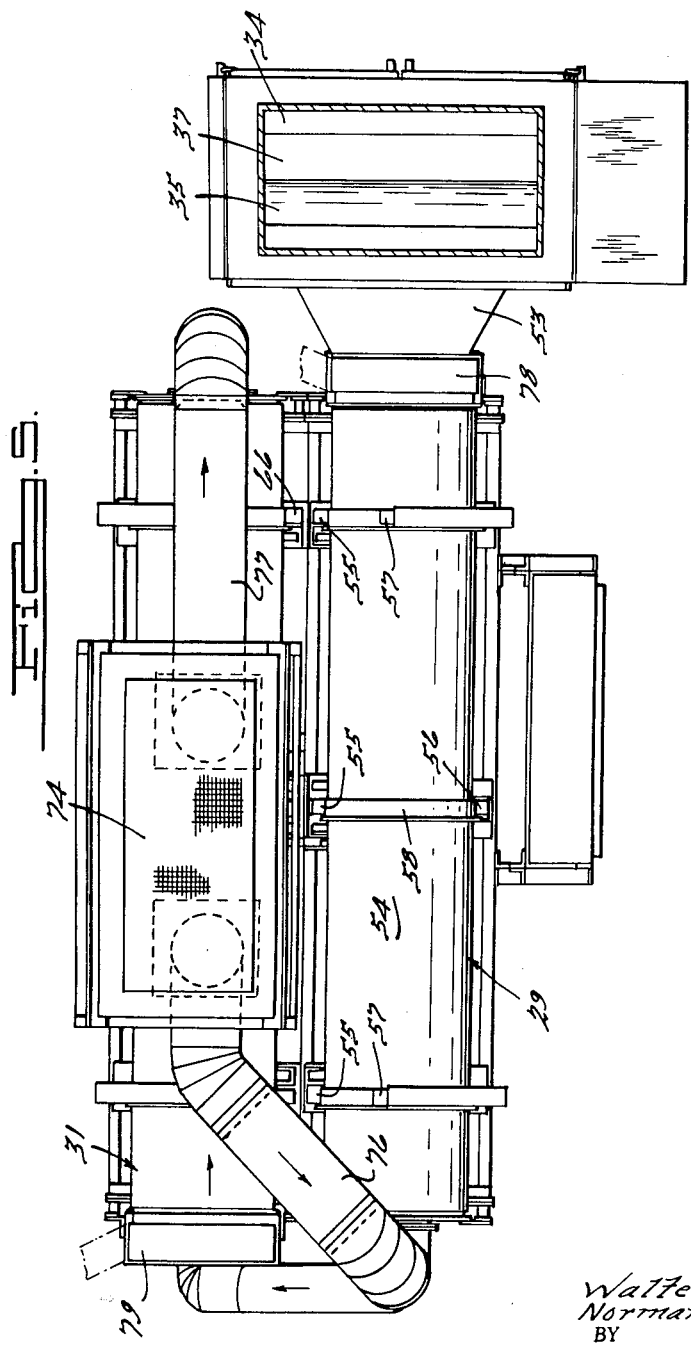

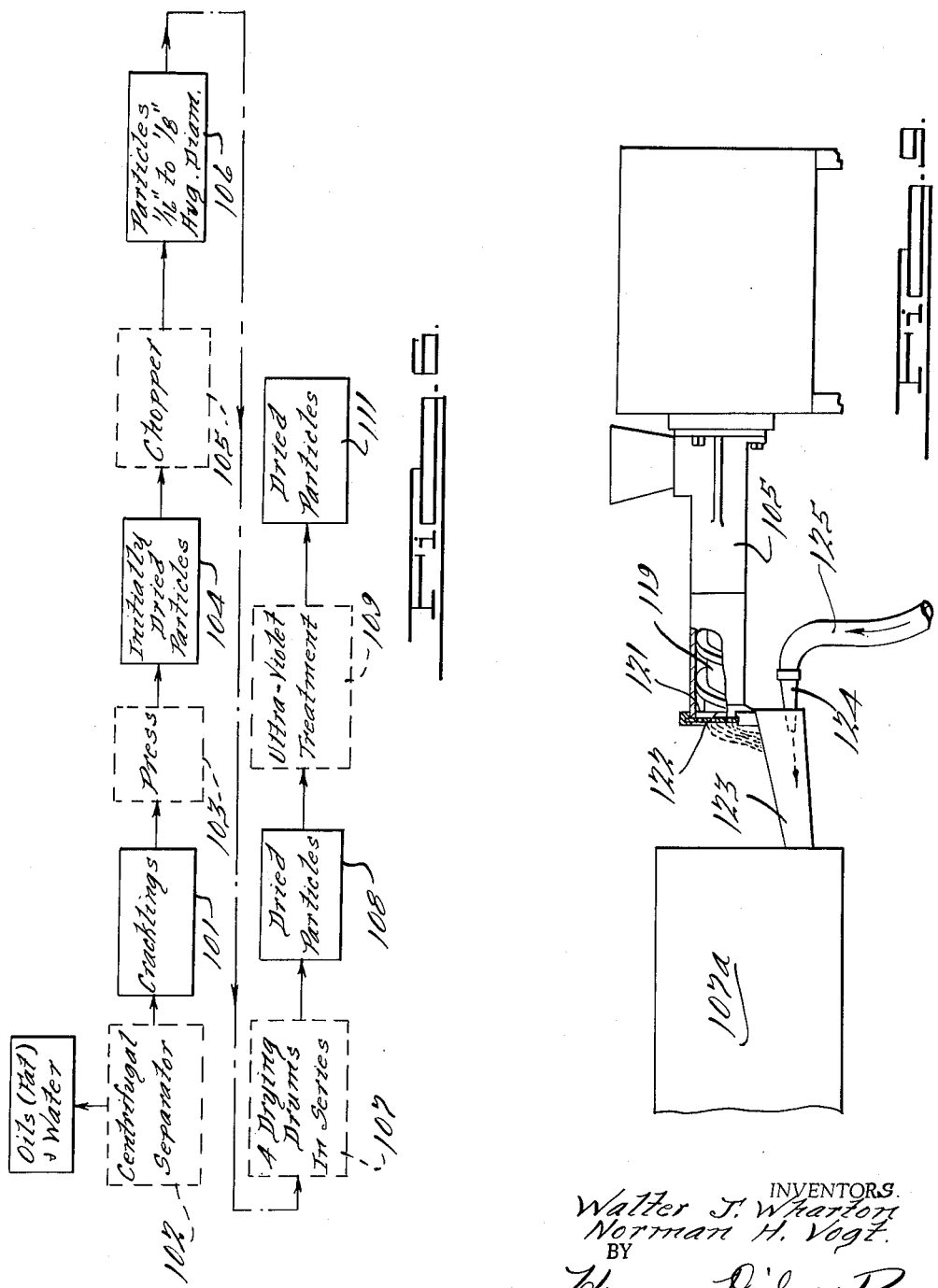

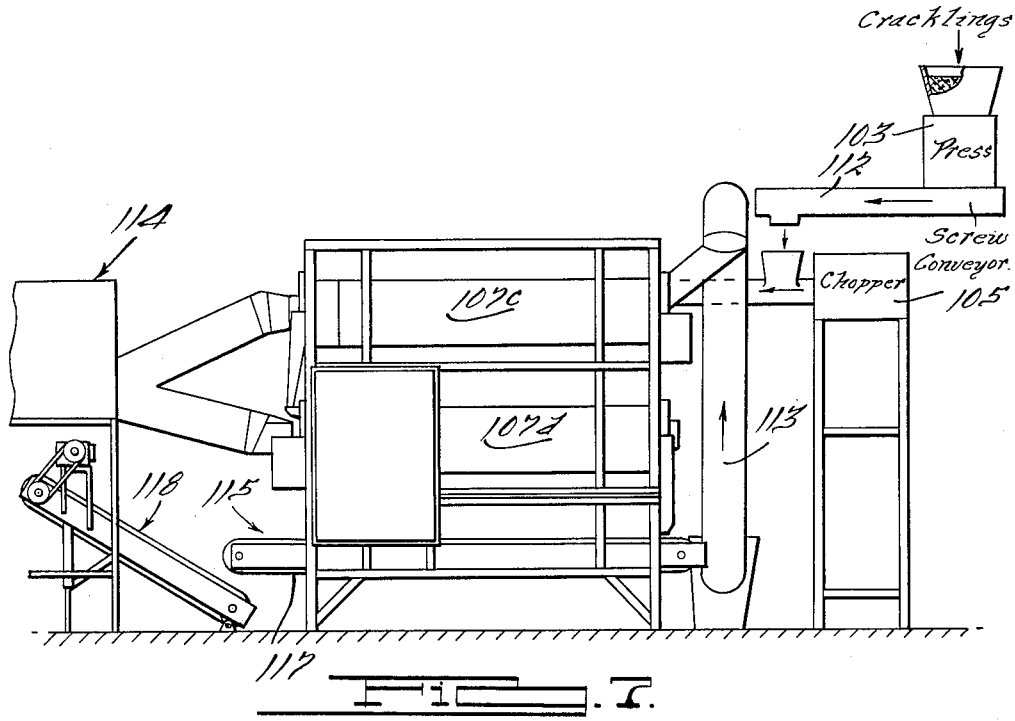
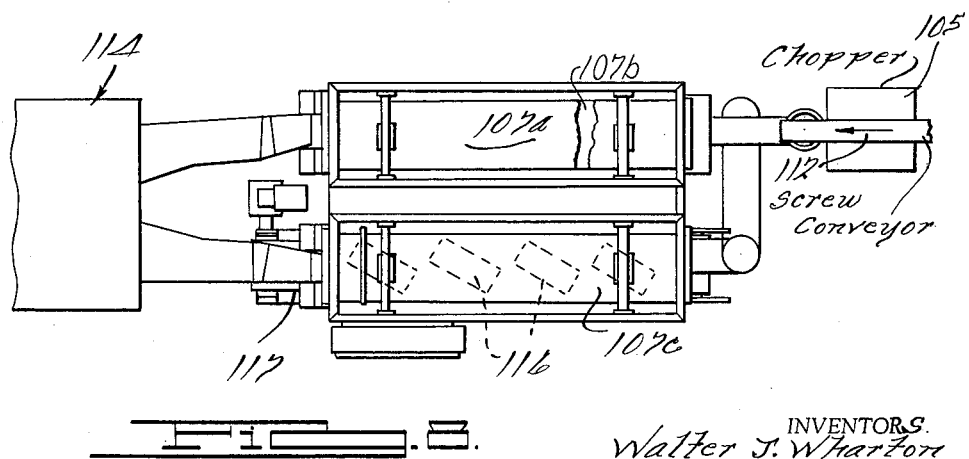

3,215,537
METHOD OF TREATING UNCOAGULATED MEAT PROTEIN SOLIDS
Walter J. Wharton, Pontiac, and Norman H. Vogt, Clawson, Mich., assignors to Taylor & Gaskin, Inc., Detroit, Mich., a corporation of Michigan
Filed Aug. 29, 1963, Ser. No. 312,815
6 Claims. (Cl. 99—208)

This application is a continuation-in-part of copending application Serial No. 197,405, filed May 24, 1962, by the present inventors and now abandoned.

This invention relates to meat products, and more particularly to a process and apparatus for treating the protein solids, commonly known as "cracklings," which result from edible fat rendering treatment of animal trimmings.

The residue or cracklings of fat rendering processes contains a substantial amount of protein solids and has been used in the past as an ingredient of animal foods. However, because of the rapid bacterial growth in such cracklings, they have been generally unavailable for use as an ingredient of foods for human consumption. Previous attempts to avoid this rapid bacterial growth, such as by rapid freezing, have been unsatisfactory and expensive, not only because of the equipment involved but because the refrigerated product must be held at low temperatures for extended periods during transportation or storage.

It is an object of the present invention to provide a process and apparatus for treating cracklings which enable their use in foods such as sausage adapted for human consumption, by inhibiting the bacterial growth and producing dried protein solids in forms which facilitate handling for food preparation purposes.

It is another object to provide a process and apparatus of this nature which result in a product capable of extended storage or transportation at ordinary temperatures and without special precautions being necessary to preserve the product quality.

It is a further object to provide an improved process and apparatus having these characteristics which are extremely reliable and economical, can be carried out at high speed in a continuous manner to produce large product quantities, and in which the final meat product may be produced in a variety of forms.

Other objects, features and advantages of the present invention will become apparent from the subsequent description, taken in conjunction with the accompanying drawings, in which:

FIGURE 1 is a flow diagram showing the manner in which animal fat trimmings are rendered and the cracklings subjected to the novel process;

FIGURE 2 is a flow diagram showing the steps in carrying out one form of the cracklings treating process;

FIGURE 3 is a side elevational view, with parts broken away, showing a suitable apparatus for carrying out the process;

FIGURE 4 is an end elevational view with parts broken away showing the relative positions of the two drying drums as well as the heating means for the pressing rollers;

FIGURE 5 is a top plan view of the apparatus showing the disposition of the heated air conduits;

FIGURE 6 is a flow diagram showing a modified form of the cracklings treating process;

FIGURE 7 is a side elevational view of a modified apparatus for carrying out the invention, utilizing a chopper interposed between the press and drying drums;

FIGURE 8 is a top plan view of the FIGURE 7 apparatus; and

FIGURE 9 is a partially schematic detailed view in elevation showing the means for entraining the particles emitted from the chopper in air and delivering them to the first drying drum.

FIGURE 1 indicates the manner in which animal fat trimmings indicated at 11 are refined by a conventional process 12 to produce edible fat 13. Trimmings 11 normally consist of fat such as kidney fat or leaf fat having no skin, but which is pure fat to be used in an edible rendering process. The fat is customarily chopped into particles about finger-tip size and the particles are cooked, for example, with live steam for about 15 to 20 minutes, to break up the tissue and melt out the fat. The temperature which is attained in this cooking portion of the process depends upon the type of fat which it is desired to render. If it is desired to render oleo stock, for example, the temperature momentarily reached may be about 160° F. and if tallow is being produced, it may be about 200° F. In any case, the temperature is usually kept below that which would detract from the quality of the rendered fat.

The liquids and solids in the cooked mixture are then separated, for example, by a centrifugal liquid-solid separator, the liquids being fed to an apparatus which separates the water from the oil. The solids, in the form of a sopnge-like tissue of microscopic loosely interconnected protein fibers with an occasional piece of gristle or connective tissue, are the cracklings 14. These leave the separator at about 130° to 140° F. and contain tiny globules of fat or oil which remain among the protein particles, the latter further having an oily coating which cannot be centrifuged out by the liquid-solid separator. The cracklings 14 have approximately the following constituents, by weight:

Water: 60% to 70%, with an average of about 67%.
Protein: 16% to 29%.
Fat: 9% to 12%.
Ash: up to 2%.

In other words, the protein-fat ratio of cracklings 14 will be somewhere between about 1.3 and about 3.2. The oil or fat will have approximately the following characteristics, in the case of beef fat, as determined by tests under standard conditions:

| Characteristics | Value |
|---|---|
| Iodine value | 37 to 47. |
| Peroxide value | 0.6 to 3.5. |
| Specific gravity | 0.901 to 0.907 at 25° C. |
| Free fatty acids | 3%. |

The iodine and peroxide values were obtained by carrying out American Oil Chemists' Society tests C.d. 1–25 (Wijs solution) and C.d. 8–53 respectively, for the sampling and analysis of commercial fats and oils.

According to one form of the novel process, as shown in FIGURE 2, cracklings 14 are subjected to a high pressure squeezing step 15 in a manner which removes a substantial amount of the fat and water. During this squeezing step, which takes place as soon as possible after the cracklings have been removed from process 12, the protein fibers and particles are preferably formed into flakes, and the cracklings are maintained at a temperature of between about 110° and 170° F., that is, above a temperature which would permit bacteria to form. The upper limit should not be exceeded for more than a few minutes after the water begins to be removed, in order to prevent destruction or deterioration of the protein. Preferably, the temperature is kept between 120° and 140° F. The fat and water are drained off as indicated at 16 and the squeezed flakes 17 are subjcted to one or more drying steps. A suitable manner of carrying out such steps is to feed the flakes 17 into a tumbling drum (step 18) subjected to heated air flow, the flakes being maintained at the 110° F. to 170° F. temperature, or preferably between 120° and 140° F., with water vapor 19 being removed. The initially dried flakes 21 leaving the first drying step are subjected to a second drying step 22 in a tumbling drum subject to heated air flow, the flake temperature here is likewise maintained in the 110° F. to 170° F. range, and preferably the 120° F. to 140° F. range. Additional water vapor 23 is removed in the second drying stage, and the dried flakes 24 are then exposed to sterilizing ultra-violet rays during a step indicated at 25, the temperature of the flakes during the ultra-violet ray treatment being permitted to be reduced to ambient temperature. The resultant product 26 consists of dried flakes with a high protein content and a sufficiently low fat and water content to inhibit bacterial growth even after extended periods of storage or transportation at room temperatures, and without special precautionary measures to prevent rancidity.

FIGURES 3 to 5 show a suitable apparatus for carrying out the novel process described above. The apparatus is generally indicated at 27 and comprises a roller press generally indicated at 28, a first drying drum generally indicated at 29, a second drying drum generally indicated at 31, and a sterilizing treatment conveyor generally indicated at 32.

Roller press 28 is enclosed in a vertically arranged cabinet 33 which is disposed below a chute 34 holding cracklings 14. A plurality of pairs of hollow stainless steel rollers 35 and 36 are disposed within cabinet 33, successive pairs of rollers preferably being spaced apart decreasing distances so that cracklings 14 fed downwardly between the rotating rollers will be pressed therebetween. A chain drive 37 is provided for rotating rollers 35 and 36 in the proper directions as indicated by the arrows for the uppermost pair of rollers in FIGURE 3. Inclined scrapers 38 are provided for the rollers which remove the meat flakes clinging thereto in such a manner that the flakes will drop between the next pair of rollers.

As seen best in FIGURE 4, each roller is provided with two wipers 39 fabricated of neoprene rubber or similar material by means of which oil and water on the roller are removed. A drip pan 41 is disposed below each wiper 39 to guide the oil and water downwardly to the bottom of cabinet 33. A trough (not visible) at the lower end of cabinet 33 is adapted to receive the drippings, and one or more drain pipes 42 lead from this trough to a drain tank 43 which may lead to a sump (not shown) by means of a drain pipe 44.

Means are provided for maintaining the meat product being pressed at a temperature of between about 110° to 170° F., and preferably between 120° and 140° F. In the illustrated embodiment, this means includes steam supply pipes 45, seen in FIGURE 4, connected by rotary unions 46 to the interiors of rollers 35 and 36. Inlet tubes 47 lead the steam to the hollow interiors of rollers 35 and 36; the condensed steam collecting in the bottoms of the rollers may be returned through the same tubes 47 under steam pressure by means of return pipes 48.

The means for driving chain 37 is mounted below cabinet 33 and comprises a variable speed motor 49, seen in FIGURE 3, this motor driving chain 37 through reduction gearing 51, chain 37 being kept in tension by a tensioning device 52.

An inclined chute 53 leads from the lowermost pair of rollers 35 and 36 to the interior of the first drying drum 29. Drum 29 comprises a hollow cylindrical shell 54 supported by a plurality of pairs of support rollers 55 and 56, three such pairs being shown in FIGURE 5, and held down by two rollers 57. Rollers 55, 56 and 57 are engageable with circular flanged tracks 58 secured to the exterior of shell 54. Thrust bearings 59, seen in FIGURE 4, are engageable with the flanges of tracks 58 to restrain axial movement of drum 29.

A motor 61 is provided for rotating drums 29 and 31. This motor drives a gear reducer 62 which in turn drives rollers 55 through a chain and pulley system seen partially in FIGURE 4 and indicated at 63; as will be later seen, this system also serves to rotate drum 31. Holddown rollers 57 are resiliently mounted so as to maintain downward pressure on drum 29. The construction of this resilient mounting will be described in detail with respect to the corresponding rollers for drum 31.

The interiors of both drums 29 and 31 are provided with means for tumbling and axially advancing the meat flakes carried therein; this tumbling means is shown in detail for drum 29 in FIGURE 3, it being understood that the construction for drum 31 is similar. The means includes a plurality of circumferentially spaced axially extending vanes 64 and a continuous spiral vane 65. The action of vanes 64 and 65 will be to cause agitation and tumbling of the flakes as well as their advance to the left in FIGURE 3 within drum 29 and to the right in FIGURE 3 within drum 31.

The construction of drum 31 as well as its supporting and rotating means are similar to those for drum 29. The supporting and rotating means includes pairs of support rollers 66 and 67, seen in FIGURES 4 and 5, and holddown rollers 68, one of which is seen in FIGURE 4. Rollers 66 are driven by chain drive 63 to rotate drum 31, roller 66 being mounted for this purpose on a shaft 69 seen in FIGURE 3.

Rollers 68 are each mounted on a support 71 shown in FIGURE 4 which is pivoted at 72 and urged in one direction by a spring 73 such that roller 68 will be held down against drum 31.

Means are provided for maintaining the temperature of the meat flakes within drums 29 and 31 between 110° and 170° F., and preferably between 120° and 140° F. As illustrated, this means includes an air heating chamber 74 mounted above the drums and having fan means driven by a motor 75 (not shown in FIGURES 4 and 5). A pair of heated air ducts 76 and 77 lead from the underside of heating chamber 74 to drums 29 and 31, respectively, as seen in FIGURES 3 and 5. More particularly, these ducts lead into the ends of drums 29 and 31 toward which the meat flakes therein are being fed. Exhaust connections 78 and 79 are provided at the opposite ends of drums 29 and 31, respectively, for the drying air.

Means are provided within drums 29 and 31 for evenly diffusing the drying air throughout the lengths of the drums. As seen in FIGURE 3, this means includes a stationary tube 81 within each drum 29 and 21, tubes 81 being of substantially smaller diameter than their respective drums with one end of each tube being connected to heated air conduit 76 or 77. The undersides of diffusing tubes 81 are provided with perforations 82 along their entire length so that heated air fed into the tubes will impinge against the flakes being tumbled within the drums. The heated air will pick up moisture from the flakes, and the moisture-laden air will be removed through exhaust connections 78 and 79.

The material delivered from the left-hand or exist end of drum 29 in FIGURE 3 will be carried by a conduit 83 to the entrance to drum 31, and a feed chute 84 is provided leading from the right-hand or exist end of drum 31 in FIGURE 3 to sterilizer conveyor 32. This conveyor comprises an endless belt 85, indicated in FIGURE 4, the belt being driven by a motor 86 through reduction gearing 87. The belt is preferably fabricated of a material suitable for handling edibles, and an upwardly flanged pan 88 is disposed beneath the belt for facilitating transfer of the material thereon.

A plurality of ultra-violent sterilizing lamps are disposed above belt 85, two such lamps 89 being indicated in FIGURE 3 and two in FIGURE 4. The lamps are disposed along the length of conveyor 32, as seen in FIGURE 3, and are so disposed as to create a sterilizing action upon the flakes spread out on conveyor 31 as they advance to the left in FIGURE 3. No means are provided for heating the flakes on conveyor 32, and means (not shown) may be provided at the left-hand end of conveyor 32 for receiving the material dropping from belt 85. Preferably, the dried meat flakes delivered from conveyor belt 85 are packaged in closed containers immediately afterwards and the slow cooling of these flakes which had begun when the flakes were delivered to conveyor 85 will continue in their packaged state. An electrical control panel is indicated at 91 for incorporating control components of apparatus 27.

In operation, cracklings 14 will be led from chute 34 into roller press 28, passing between successive pairs of rollers 35 and 36 and being squeezed thereby. This squeezing is partly for the purpose of removing oil or fat, but will additionally remove some water, oil and water being collected in drain tank 43 while the squeezed material, now in the form of flakes, passes along chute 53 to first drying drum 29. During its passage through roller press 28, the material will be kept at a temperature of between 110° and 170° F., and preferably between 120° and 140° F., by steam fed into the interiors of rollers 35 and 36.

The material entering drum 29 will be tumbled within the drum as it advances, and will be maintained at the 110° to 170° (preferably 120° to 140°) temperature by the heated air issuing from conduit 81. This heated air will evaporate moisture from the flakes, and continued evaporation will occur when the flakes pass from drum 29 to drum 31. The flakes leaving drum 31 will pass along chute 84 to conveyor belt 85, and will pass along the conveyor, being subjected to ultra-violent sterilizing rays from lamps 89.

As stated above, the pressing step in the process has as one purpose the removal of oils or fat, since the presence of these substances would inhibit water evaporation in the drying stages. However, a substantial amount of water will be also removed in the pressing stage, thus reducing the amount of water which must be evaporated in the drying stage. The relation between the quantity of removed oil and water and the quantity of flakes transferred from the pressing stage to the first drying stage will of course vary with the construction of the apparatus and the initial composition of crackling 14.

The form, and particularly the particle size, of the final product may be varied to suit requirements. For example, the dried meat flakes 26 leaving step 25 of the process (see FIGURE 2) may be passed through a grinder or similar apparatus (not shown) which will further comminute the flakes into powdered form, thus facilitating use of the product as an ingredient in certain types of foods.

The following is a description of a test which was carried out using the principles of the novel process, illustrating the fact that the final product derived therefrom is of sufficiently high quality to serve as an ingredient in foods intended for human consumption. Cracklings were taken for test purposes from the centrifuge of a fat rendering system of the type in which comminuted fatty tissue in thermal equilibrium is subjected to centrifugal separation which separates rendered fat 13 from cracklings 14. The cracklings taken from the centrifuge had approximately the composition indicated at 14 in FIGURE 1.

The crackling were passed through apparatus 27 and subjected to the novel process described above. During the process, thermostatic controls kept the surfaces of rollers 35 and 36 at a temperature of between 140° and 150° F., and maintained the interiors of drums 29 and 31 at about 180° F. Due to the speed of passage of the cracklings between the rollers, and the fact that water was being evaporated from the pressed flakes while in drums 29 and 31, the temperature of the product throughout its passage through the squeezing and drying stages was maintained within the range of 110° and 170° F., and more specifically was maintained at a temprature of about 125° F.

After leaving ultra-violent treatment stage 25, meat flakes 26 were analyzed by laboratory techniques and found to have the following composition:

| | |
|---|---|
| Moisture ___percent__ | 9.1 |
| Equivalent protein ___do____ | 78.9 |
| Fat ___do____ | 11.6 |
| Ash ___do____ | 0.4 |
| Total bacterial count (viable bacteria per gram of sample—APT agar—30° C.—48 hours) _____ | 0 |
| Protein-fat ratio _____ | 7.18 |

The bacterial count thus meets standard requirements for ingredients in foods to be used for human consumption. The 9.1% moisture content of the sample was within acceptable limits for indefinite storage in air at ambient temperatures without bacterial deterioration of the product.

FIGURE 6 illustrates a modified form of process which differs from that shown in FIGURE 2 mainly in that the flakes or particles leaving the processing stage are chopped to a predetermined size before entering the drying stage. The cracklings 101 leaving the centrifugal separator 102 are fed into a press 103 which squeezes out a substantial amount of oil and water, as in the previous embodiment. It may be stated at this point that a press which subjects the cracklings to high pressure over a substantial time period, say 30 seconds at 250 p.s.i.g., is preferred (in terms of water and oil removal) over one such as roller press 28 in which the pressure applications are momentary. Of course, press 103 should operate continuously rather than by a batch method in order to fulfill one of the objects of the invention, namely, a high speed operation for large quantity production. A suitable press has been found to be an auger type vertical continuous press.

The initially dried flakes or particles 104 are then fed, for example by a screw conveyor, to a chopper 105 which is similar to an ordinary meat chopper, having an auger and a plate with small spaced holes through which the particles are extruded, a rotating multi-bladed chopping member being adjacent the plate (see description of FIGURE 9). The particles are chopped to a preferred size of 1/16 inch to 1/8 inch average diameter, and in no case greater than 1/4 inch, in order to assure thorough drying and proper exposure to the ultra-violet rays. The particles 106 leaving the chopper are fed to a series of drying drums, for example, 4 drying drums, similar to those in the previous embodiment. These drying drums are indicated at 107 in FIGURE 6. The dried particles 108 leaving the drums are fed to ultra-violet equipment 109, from which is delivered the completed product 111. The latter may be pulverized or otherwise treated after delivery.

FIGURES 7, 8 and 9 illustrate, in partially schematic form, some of the equipment used to carry out the process shown in FIGURE 6. The cracklings are fed into press 103 and are conveyed by a screw conveyor 112 from the press to chopper 105. Four drying drums 107a, b, c and d are provided, with the chopped material being delivered to drum 107a from chopper 105 and thence in series through drums 107b, c and d. The drums are shown as being in nested relation, with an auger elevator 113 being provided for delivering the particles from drum 107b (which is hidden below drum 107a in FIGURE 8) to drum 107c.

Heating means generally indicated at 114 are provided for supplying heated air to the drying drums so as to maintain the temperature of the particles in the ranges described above. No heat need be supplied to the press since the cracklings will be maintained within the desired temperature range by the heat built up within the press. The particles will also maintain the proper temperature range during travel through screw conveyor 112 and chopper 105, so that no heat need be supplied at the screw conveyor and the chopper.

The ultra-violet stage is indicated generally at 115 in FIGURES 7 and 8, and is similar to that shown in FIGURE 3, being disposed below drums 107 and having ultra-violet lamps 116 disposed above a conveyor belt 117. In a suitable embodiment of the invention, four pairs of ultra-violet lamps of 15 watts each (8 lamps in all) were used, the lamps emitting rays in the concentrated germicidal killing range (3660 Angstrom units). The lamps were spaced 8 inches above a belt which traveled at 60 feet per minute, with an overlapping arrangement (seen in FIGURE 8) between the pairs of lamps, each of which was about 18 inches long. The exposure time of the particles to ultra-violet rays was a fraction over 7 seconds. The product leaving belt 117 was delivered to an inclined conveyor 118 which carried it toward the packaging station.

FIGURE 9 shows details of chopper 105 as well as the manner in wihch the particles are delivered from the exit of chopper 105 to drying drum 107a. The chopper has an auger 119 at the end of which is a rotary multiple cutting blade 121. This blade is adjacent a plate 122 having holes of about 3/32 inch diameter. A chute 123 is disposed at the exit of chopper 105 onto which the particles will drop, with an air nozzle 124 at the chute entrance pointing toward the chute exit. Nozzle 124 is supplied with compressed air through a hose 125 and the chopped particles will be blown into drum 107a while being suspended by the air emitted from nozzle 124. In this manner, the air-entrained particles are scattered and will not tend to adhere to each other.

The following is a definition of the composition and chemical constituency of the final product of this invention:

Water: 1 to 11%, preferably 3 to 5%.
Protein: 70 to 92%, preferably 85 to 89%.
Fat: 5 to 18%, preferably 6 to 8%.
Ash: Up to about 2%.
Protein-fat ratio: 3.9 to 18.4, preferably 4.7 to 14.8.

The following is an approximate chemical analysis (using the same test methods as those described above) of the oil in the final product after carrying out the process of FIGURE 6, with the exception of the fact that the pressing step was omitted. In other words, the cracklings 101 were delivered directly to the chopper 105. As pointed out above, the presence or absence of the pressing step does not affect the final chemical composition, the primary purpose of the pressing step being to ease the work required during the drying step by removing a substantial amount of oil and water.

| Characteristic: | Value |
| --- | --- |
| Iodine value | 54 to 55. |
| Peroxide value | 3.0 to 3.5. |
| Specific gravity | 0.913 to 0.916 at 25° C. |
| Free fatty acids | 1.2% to 1.4%. |

It was found that the color of the oil in the final product was darker in both the yellow and red factors than the oil delivered as the main product from separator 102.

It will be noted that the final product will have a protein-fat ratio which is much higher than the protein-fat ratio of the initial cracklings. The final product will also have a considerable higher iodine value, the iodine value being a measure of the total unsaturated fats containing only isolated double bonds. The peroxide value will remain about the same, which in view of the fact that the product has been subject to extensive heating and air exposure is a very desirable result. The higher the peroxide value the shorter the shelf life of the product, and the fact that the peroxide value did not rise indicates that the product has a long and stable bacteria-free shelf life.

It should be noted that the protein-fat ratio of the final product is substantially higher than that of the starting material. This is a very important advantage of the invention, since it results in transforming a substance having relatively little food value to one having a high food value.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A method for the treatment of uncoagulated protein solids obtained from an animal fat rendering process which comprises the steps of subjecting the protein solids to high pressure in order to squeeze excess oil and water therefrom while reducing the protein solids to particles and maintaining them at a temperature above 110° F., and drying the squeezed particles to reduce the moisture to less than 11% by weight of the final product.

2. A method for the treatment of uncoagulated protein solids obtained from an animal fat rendering process which comprises the steps of subjecting the protein solids to high pressure in order to squeeze excess oil and water therefrom while reducing the protein solids to particles and maintaining them at a temperature above 110° F., drying the squeezed particles while still maintaining said temperature above 110° F. to reduce the moisture to less than 11% by weight of the final product, and subjecting the dried particles to sterilizing ultra-violet rays.

3. A method for the treatment of uncoagulated protein solids obtained from an animal fat rendering process which comprises the steps of subjecting the protein solids to high pressure in order to squeeze excess oil and water therefrom while reducing the protein solids to particles and maintaining them at a temperature between 110° F. and 170° F., and drying the squeezed particles to reduce the moisture to less than 11% by weight of the final product.

4. A method for the treatment of uncoagulated protein solids obtained from an animal fat rendering process which comprises the steps of subjecting the protein solids to high pressure in order to squeeze excess oil and water therefrom while reducing the protein solids to particles and maintaining them at a temperature between 110° F. and 170° F., drying the squeezed particles to reduce the moisture to less than 11% by weight of the final product, and subjecting the dried particles to sterilizing ultra-violet rays.

5. A method for the treatment of uncoagulated protein solids obtained from an animal fat rendering process which comprises the steps of subjecting the protein solids to high pressure in order to squeeze excess oil and water therefrom while reducing the protein solids to particles and maintaining them at a temperature between 110° F. and 170° F., drying the squeezed particles to reduce the moisture to less than 11% by weight of the final product, subjecting the dried particles to sterilizing ultra-violet rays, and grinding the squeezed and dried particles to produce a powder.

6. In a method for treating protein solids from an edible fat rendering process and having a protein-fat ratio of between 1.3 and 3.2, the steps of pressing the protein solids to remove oil and water therefrom while maintaining the solids at a temperature of between 110° and 170° F., chopping the pressed solids into particles having an average diameter of between 1/16 inch and 1/4 inch, maintaining the temperature of said particles between 110° and 170° F. while being chopped, maintaining the chopped particles in a substantially non-adhering condition, drying the chopped particles while continuously maintaining said temperature at between 110° and 170° F. to reduce the moisture to less than 11% by weight of the final product, subjecting the dried particles to sterilizing ultra-violet rays, and permitting the dried particles to cool.

References Cited by the Examiner

UNITED STATES PATENTS

| | | | |
|---|---|---|---|
| 1,317,675 | 10/19 | Allbright. | |
| 1,521,127 | 12/24 | Remus | 99—208 |
| 1,536,308 | 5/25 | Remus | 99—208 |
| 1,974,626 | 9/34 | Newton et al. | |
| 1,975,916 | 12/34 | Bech | 100—57 |
| 2,439,180 | 4/48 | McKee et al. | 99—208 |
| 3,040,654 | 6/62 | Opie | 100—53 |

A. LOUIS MONACELL, *Primary Examiner.*

HYMAN LORD, *Examiner.*

UNITED STATES PATENT OFFICE
CERTIFICATE OF CORRECTION

Patent No. 3,215,537            November 2, 1965

Walter J. Wharton

It is hereby certified that error appears in the above numbered patent requiring correction and that the said Letters Patent should read as corrected below.

Column 2, line 33, for "sopnge" read -- sponge --; column 4, line 64, for "21" read -- 31 --; column 5, line 59, and column 6, line 4, for "crackling", each occurrence, read -- cracklings --; column 6, line 36, for "processing" read -- pressing --.

Signed and sealed this 6th day of September 1966.

(SEAL)
Attest:

ERNEST W. SWIDER
Attesting Officer

EDWARD J. BRENNER
Commissioner of Patents